(12) United States Patent
Matsumura

(10) Patent No.: US 8,036,194 B2
(45) Date of Patent: Oct. 11, 2011

(54) COMMUNICATION DEVICE

(75) Inventor: Masafumi Matsumura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/716,637

(22) Filed: Mar. 3, 2010

(65) Prior Publication Data

US 2010/0329223 A1 Dec. 30, 2010

(30) Foreign Application Priority Data

Jun. 24, 2009 (JP) ................................. 2009-150201

(51) Int. Cl.
*H04W 4/00* (2009.01)
(52) U.S. Cl. ........................................ 370/338; 370/465
(58) Field of Classification Search .................. 370/310, 370/338–339, 465–474, 299, 312, 349–351, 370/389–427, 913, 915, 60
See application file for complete search history.

(56) References Cited

U.S. PATENT DOCUMENTS

| | | | | |
|---|---|---|---|---|
| 2002/0154692 A1* | 10/2002 | Martin | ...................... | 375/240.01 |
| 2006/0092893 A1* | 5/2006 | Champion et al. | ............ | 370/338 |
| 2009/0278993 A1* | 11/2009 | Nishikawa et al. | ........... | 348/723 |
| 2009/0285138 A1* | 11/2009 | Thomas et al. | ................ | 370/310 |

FOREIGN PATENT DOCUMENTS

| | | |
|---|---|---|
| JP | 2006-332835 A | 12/2006 |
| JP | 2007-235370 | 9/2007 |
| JP | 2008-035517 A | 2/2008 |
| JP | 2008-283561 | 11/2008 |
| JP | 2009-016913 A | 1/2009 |
| WO | WO-2007/037478 | 4/2007 |
| WO | WO 2007037478 A1 * | 4/2007 |

OTHER PUBLICATIONS

Japanese Office Action dated May 11, 2010, Japanese Patent Application No. 2009-150201.

* cited by examiner

*Primary Examiner* — Pao Sinkantarakorn
*Assistant Examiner* — Iqbal Zaidi
(74) *Attorney, Agent, or Firm* — Patterson & Sheridan, LLP

(57) ABSTRACT

According to one embodiment, a communication device connected wirelessly to a source-side communication device includes a wired communication module, first and second wireless communication modules, and a communication controller. The wired communication module transmits a video signal and exchanges a data signal with a sink device via wired communication. The first wireless communication module receives a video signal through a first wireless communication system. The second wireless communication module transmits and receives a data signal through a second wireless communication system. The communication controller performs processing related to a physical address used in the communication system of the wired communication module. The communication controller relays information as to data communication capability exchanged between the sink device and the source device, and exchanges information as to data communication capability with the source-side communication device. When the devices are capable of data communication, the communication controller sets data communication as possible.

12 Claims, 4 Drawing Sheets

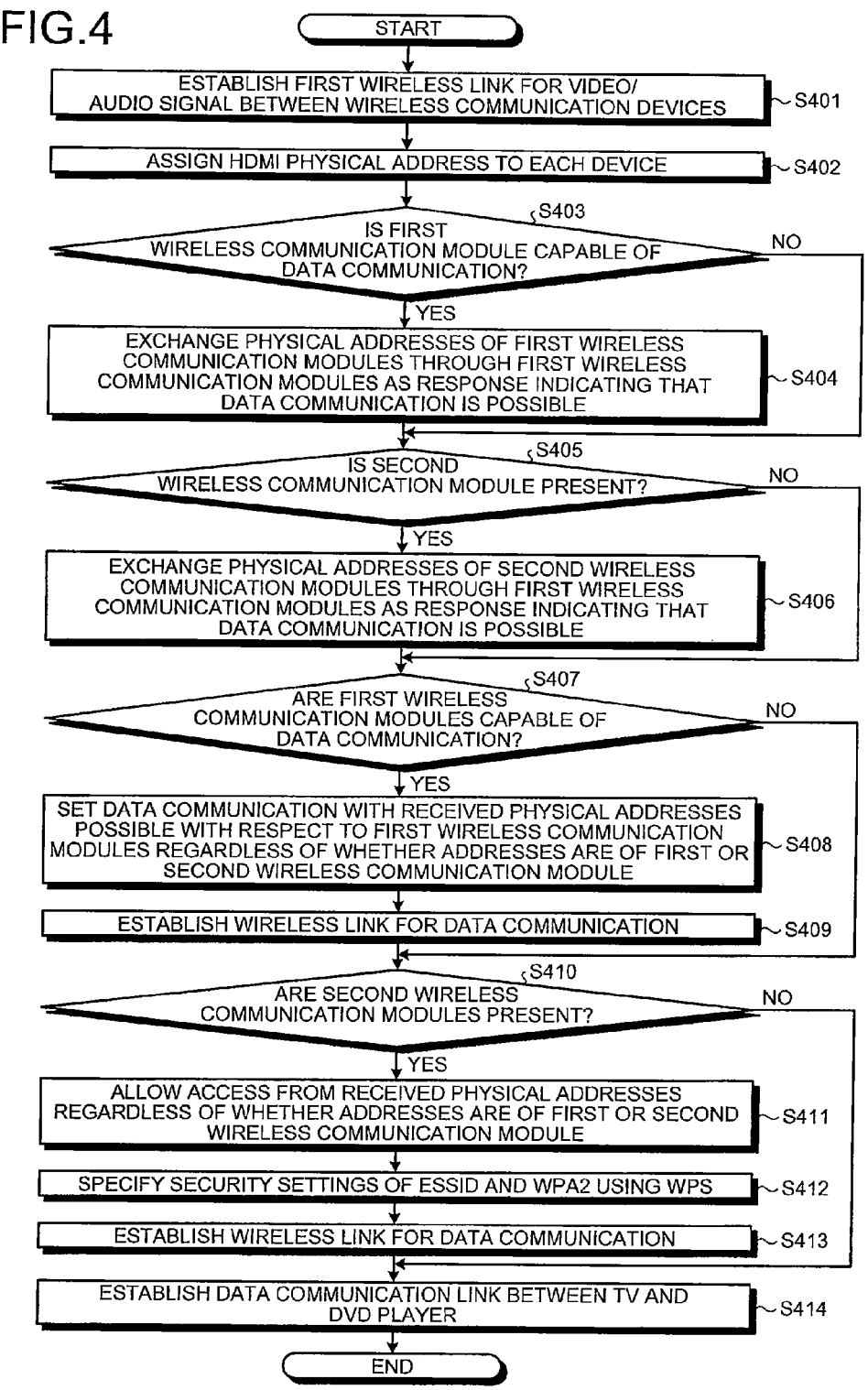

COMMUNICATION DEVICE

CROSS-REFERENCE TO RELATED APPLICATIONS

This application is based upon and claims the benefit of priority from Japanese Patent Application No. 2009-150201, filed on Jun. 24, 2009, the entire contents of which are incorporated herein by reference.

BACKGROUND

1. Field

One embodiment of the invention relates to a communication device that transmits a video and audio signal and a data signal via wireless communication.

2. Description of the Related Art

The IEEE 802.15 Working Group is pursuing standardization of wireless communication technology using 60 GHz band. This wireless communication technology is aimed at a wireless personal area network (WPAN), which is a wireless network having a coverage range of up to 10 m. The wireless communication technology enables gigabit-order wireless transmission using a wide band through a conventional wireless large area network (LAN) or Bluetooth. Thus, without via existing wired communication capable of transmitting a video/audio signal at high speed, such as a high definition multimedia interface (HDMI), a video/audio signal can be transmitted wirelessly.

For example, Japanese Patent Application Publication (KOKAI) No. 2008-35517 discloses a conventional technology for transmitting a video/audio signal wirelessly. According to the conventional technology, a system transmits/receives a video signal wirelessly according to the HDMI standard. Especially, by transmitting/receiving setting information for a display module wirelessly, the setting information of the display module can be read at higher speed.

On the other hand, in recent years, the HDMI standard has been being standardized to enable data communication in addition to video/audio signal transmission. The wireless communication technology described above enables not only wireless transmission of a video/audio signal but also wireless data communication over, for example, an Internet protocol (IP) network if it is one-to-one communication between wireless communication devices due to the high directivity.

Via wired communication, video/audio communication and data communication can be performed simultaneously through a single cable. On the other hand, via wireless communication, it is often difficult to perform both video/audio communication and data communication at the same time for the following reasons. (1) Video equipment cannot recognize that data communication cannot be supported in a wireless section. (2) Since a video signal requires many bands, simultaneous video/audio communication and data communication degrade video quality. (3) A band may not be ensured for data communication in a wireless section. (4) If a millimeter wave band with a wide tuning range is used to further perform data communication, when a plurality of wireless communication devices and a plurality of wireless links exist, it is not suitable for data communication because of the high directivity. Besides, the use of a plurality of wireless communication systems makes it complicated to establish a secure connection.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary flowchart of the operation of the system illustrated in FIG. 3 to establish communication in the embodiment.

DETAILED DESCRIPTION

Figure 1:
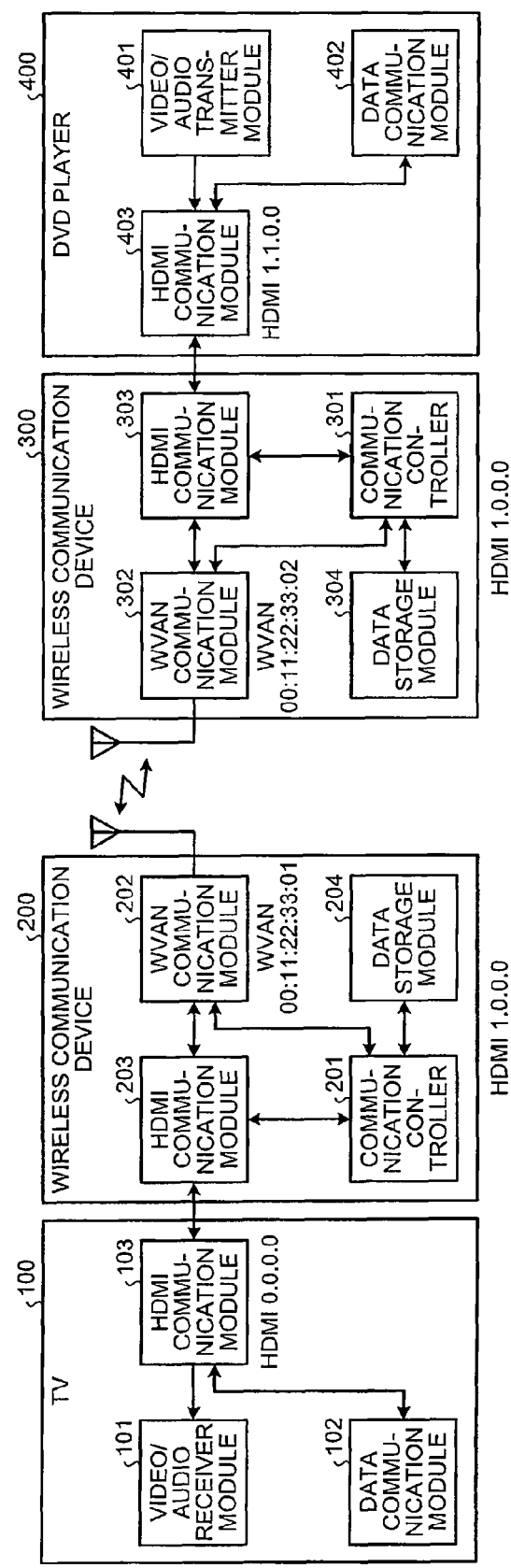
FIG. 1 is an exemplary block diagram of a system comprising a wireless communication device for explaining the basic function of establishing communication according to the high definition multimedia interface (HDMI) standard and the wireless HD standard according to an embodiment of the invention.

Various embodiments according to the invention will be described hereinafter with reference to the accompanying drawings. In general, according to one embodiment of the invention, a communication device is connected wirelessly as a sink-side device to a source-side communication device, and comprises a wired communication module, a first wireless communication module, a second wireless communication module, and a communication controller. The wired communication module is configured to transmit a video signal to a sink device and exchange a data signal with the sink device via wired communication. The first wireless communication module is configured to receive a video signal from the source-side communication device that is connected via a wire to a source device through a first wireless communication system capable of at least transmission and receipt of a video signal. The second wireless communication module is configured to exchange a data signal with the source-side communication device through a second wireless communication system. The communication controller is configured to control communication by the wired communication module, the first wireless communication module, and the second wireless communication module. The communication controller is configured to perform processing related to a physical address used in a communication system of the wired communication module with the source-side communication device after the first wireless communication module establishes a wireless link. Further, the communication controller is configured to relay information as to data communication capability exchanged between the sink device and the source device through the wired communication module and the first wireless communication module. Still further, the communication controller is configured to exchange information as to data communication capability with the source-side communication device through the first wireless communication module. Still further, the communication controller is configured to, when the sink device, the source device, and the source-side communication device are capable of data communication, set data communication as possible with a communication module assigned a physical address for wireless communication performed through the second wireless communication module.

According to another embodiment of the invention, a communication device is connected wirelessly as a source-side device to a sink-side communication device, and comprises a wired communication module, a wireless communication module, and a communication controller. The wired communication module is configured to exchange a video signal and a data signal with a source device via wired communication. The wireless communication module comprises a first wireless communication module configured to transmit a video signal to the sink-side communication device through a wireless communication system capable of at least transmission and receipt of a video signal and a data signal. The communication controller is configured to control communication by the wired communication module and the wireless communication module. The communication controller is configured to, after the first wireless communication module establishes a wireless link between the communication devices, set a common physical address related to the wired communication module between the communication devices. Further, the communication controller is configured to relay information as to data communication capability exchanged between a sink device and the source device through the wired communication module and the first wireless communication module. Still further, the communication controller is configured to exchange information as to whether data communication is possible between the wireless communication module and a wireless communication module of the sink-side communication device through the first wireless communication module. Still further, the communication controller is configured to, when the sink device, the source device, and the sink-side communication device are capable of data communication, set data communication as possible with a device or a communication module assigned the physical address.

Preceding the description of a wireless communication device according to an embodiment of the invention, first, a description will be given of establishment of communication according to the high definition multimedia interface (HDMI) standard and the wireless HD standard, which is a basic function of the wireless communication device. FIG. 1 is a block diagram of a system comprising wireless communication devices 200 and 300 of the embodiment. For simplicity of description, it is assumed herein that the wireless communication devices 200 and 300 each comprises a wireless communication module (wireless video area network (WVAN) communication module) that employs a single wireless communication system according to the wireless HD standard that supports HDMI Ethernet (registered trademark) channel (HEC) in HDMI 1.4. In the system exemplified in FIG. 1, the two wireless communication devices 200 and 300 are wirelessly connected to each other, and a video/audio receiver as a sink device is connected to one of them by a wire (HDMI), while a video/audio transmitter as a source device is connected to the other by a wire (HDMI).

As illustrated in FIG. 1, the system comprises a television (TV) 100, the wireless communication devices 200 and 300, and a digital versatile disk (DVD) player 400. The TV 100 is a video/audio receiver. While the TV 100 is described by way of example as the video/audio receiver, the video/audio receiver may be, for example, a projector or the like. The TV 100 comprises a video/audio receiver module 101, a data communication module 102, and an HDMI communication module 103. The video/audio receiver module 101 receives a video/audio signal and performs predetermined signal processing on the received video/audio signal, thereby outputting it to a display and a speaker (both not illustrated). The data communication module 102 performs data communication between the TV 100 and other devices using an Internet protocol (IP) network or the like. The HDMI communication module 103 is a wired communication module that performs video/audio communication and data communication via a wire (in the embodiment, according to the HDMI standard).

The wireless communication device 200 receives a video/audio signal and performs dada communication. The wireless communication device 200 comprises a communication controller 201, a WVAN communication module 202, an HDMI communication module 203, and a data storage module 204. The communication controller 201 comprises a central processing unit (CPU) and the like, and controls the overall operation of the WVAN communication module 202 and the HDMI communication module 203. The WVAN communication module 202 is a wireless communication module that receives a video/audio signal and performs data communication wirelessly. Specifically, in the embodiment, a WVAN is cited as an example that is constituted by a wireless communication system capable of wireless HD video/audio communication or the like using a millimeter wave band of 60 GHz.

The data storage module 204 stores information necessary for the communication controller 201 to control communication (control program for the communication controller 201, a physical address, etc.). Specifically, the data storage module 204 may be, for example, a read only memory (ROM), a random access memory (RAM), a hard disk drive (HDD), or the like. In FIG. 1 and other drawings, "HDMI 1.0.0.0" or the like indicates that the physical address based on the HDMI standard (hereinafter, "HDMI physical address") of the device or the HDMI communication module is 1.0.0.0" or the like. Incidentally, the HDMI physical address is dynamically assigned. Similarly, "WVAN 00:11:22:33:01" or the like indicates that the physical address of the WVAN is 00:11:22:33:01 or the like. This address is uniquely assigned upon the shipment of a product.

The wireless communication device 300 transmits a video/audio signal and performs dada communication (data transmission/receipt). The wireless communication device 300 comprises a communication controller 301, a WVAN communication module 302, an HDMI communication module 303, and a data storage module 304. The communication controller 301, the WVAN communication module 302, the HDMI communication module 303, and the data storage module 304 have the same function as the communication controller 201, the WVAN communication module 202, the HDMI communication module 203, and the data storage module 204, respectively.

The DVD player 400 is a video/audio transmitter capable of transmission of a video/audio signal and data communication. While the DVD player 400 is described by way of example as the video/audio transmitter, the video/audio transmitter may be, for example, a personal computer or the like. The DVD player 400 comprises a video/audio transmitter module 401, a data communication module 402, and an HDMI communication module 403. The video/audio transmitter module 401 performs predetermined signal processing on data read from a storage medium such as a DVD (not illustrated) to generate a video/audio signal, and transmits the generated video/audio signal. The data communication module 402 performs data communication between the DVD player 400 and other devices over an IP network or the like. The HDMI communication module 403 is a wired communication module that performs video/audio communication and data communication via a wire (in the embodiment, according to the HDMI standard).

Figure 2:
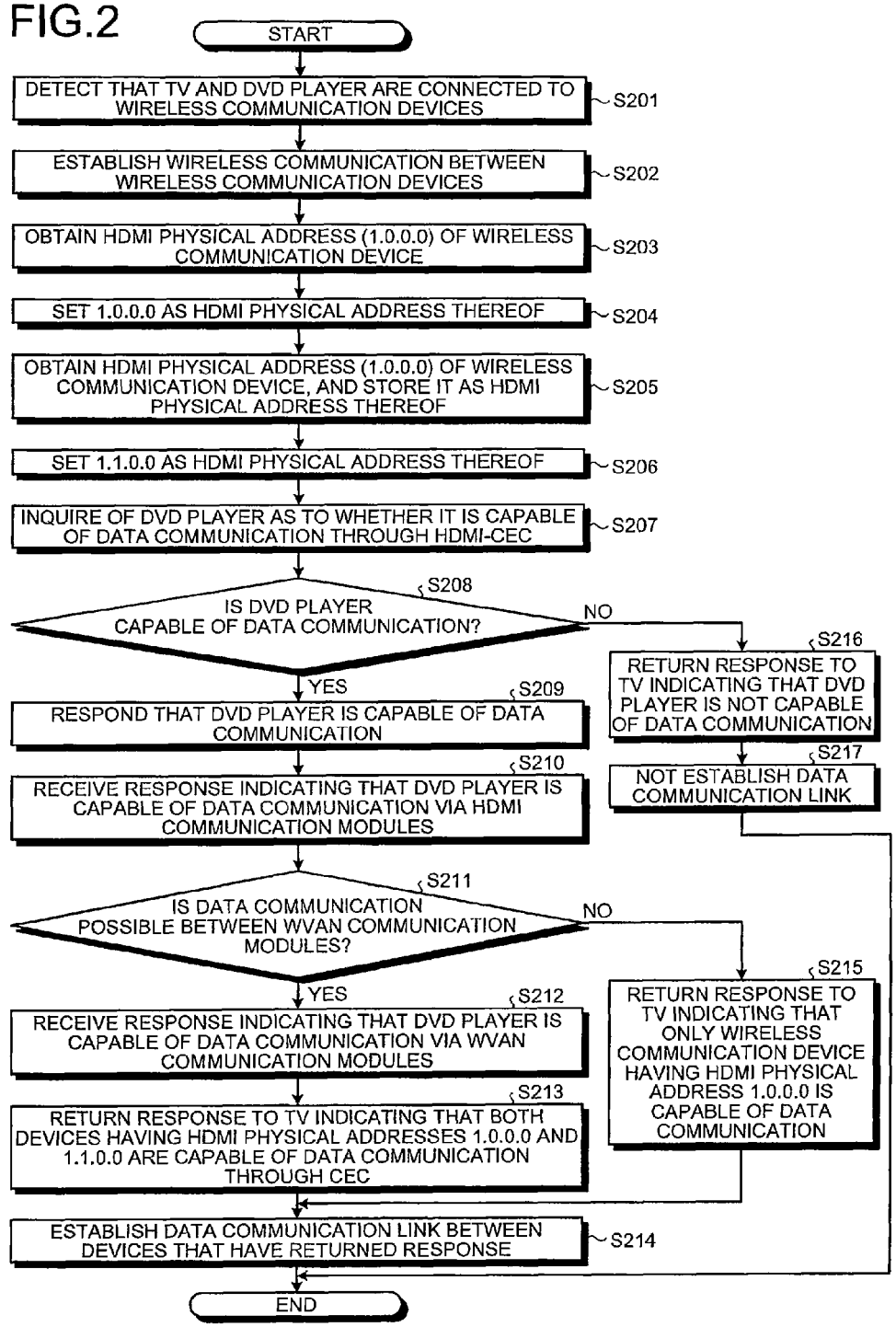
FIG. 2 is an exemplary flowchart of the operation of the system illustrated in FIG. 1 to establish communication in the embodiment.

With reference to FIGS. 1 and 2, a description will be given of the operation of each device in the system configured as above. FIG. 2 is a flowchart of the operation of the TV 100, the wireless communication devices 200 and 300, and the DVD player 400 in the system illustrated in FIG. 1 to establish communication. In the following, the TV 100 is assumed to be capable of data communication.

When the TV 100 and the DVD player 400 are connected to the wireless communication devices 200 and 300, respectively, by an HDMI cable after the wireless communication devices 200 and 300 are turned on, the wireless communication devices 200 and 300 detects the connection (S201). To transmit a video/audio signal, the wireless communication devices 200 and 300 establish wireless communication between the WVAN communication modules 202 and 302 (S202). At this point, the HDMI physical address of the TV 100 as a sink device is 0.0.0.0 as illustrated in FIG. 1. In the wireless communication device 200, the communication controller 201 obtains the HDMI physical address (1.0.0.0) of the wireless communication device 200 via the HDMI communication module 203 (S203). More specifically, the communication controller 201 obtains the HDMI physical address through an HDMI port of the TV 100 that is connected to the wireless communication device 200 (it is assumed that 1.0.0.0 is assigned to the HDMI port as an HDMI address). Thus, the wireless communication device 200 sets 1.0.0.0 as the HDMI physical address thereof as illustrated in FIG. 1 (S204).

Next, the communication controller 301 of the wireless communication device 300 obtains the HDMI physical address (1.0.0.0) of the wireless communication device 200, and stores the address as the HDMI physical address thereof (S205). The communication controller 301 then assigns an HDMI physical address to each HDMI port based on the HDMI physical address of the wireless communication device 300. The DVD player 400 obtains the HDMI physical address (1.1.0.0) thereof through an HDMI port to which the DVD player 400 is connected (it is assumed that 1.1.0.0 is assigned to the HDMI port as an HDMI address by the communication controller 301). Thus, the DVD player 400 sets 1.1.0.0 as the HDMI physical address thereof as illustrated in FIG. 1 (S206). Here, if a video/audio receiver such as the TV 100 and a video/audio transmitter such as the DVD player 400 wish to perform data communication, a query is issued to the nearest device having an HDMI physical address as to whether the device is capable of data communication through consumer electronic control (CEC). The CEC is a device control signal and a control protocol standardized by HDMI.

In FIG. 1, HDMI physical addresses 0.0.0.0, 1.0.0.0, and 1.1.0.0 are assigned to the TV 100, the wireless communication device 300, and the DVD player 400 as HDMI devices, respectively, in the process described above. In this case, if wishing to establish data communication, the TV 100 inquires of another device having an HDMI physical address as to whether the device is capable of data communication (S207). When data communication is possible between the wireless communication devices 200 and 300, and also the DVD player 400 is capable of data communication, the DVD player 400 returns a response to the TV 100 indicating that the DVD player 400 is capable of data communication with its HDMI physical address. The wireless communication device 200 also returns a response to the TV 100 indicating that data communication is possible with its HDMI physical address.

More specifically, if having a data communication capability or function (Yes at S208), the DVD player 400 responds that it is capable of data communication (S209). The communication controller 301 receives the response via the HDMI communication modules 303 and 403 (S210). Further, if data communication is possible between the wireless communication devices 200 and 300 (Yes at S211), the communication controller 201 receives a response that the DVD player 400 is capable of data communication via the WVAN communication modules 202 and 302 (S212). The communication controller 201 returns a response to the TV 100 indicating that all the devices having HDMI physical addresses 1.0.0.0 and 1.1.0.0 are capable of data communication through CEC (S213). Then, a data communication link is established between the devices that have returned a response (S214).

On the other hand, if data communication is not possible between the wireless communication devices 200 and 300, i.e., the WVAN communication modules 202 and 302 (No at S211), the wireless communication devices 200 and 300 do not relay the response from the DVD player 400 indicating that the DVD player 400 is capable of data communication. The communication controller 201 returns a response to the TV 100 indicating that only the wireless communication device 200 having the HDMI physical address 1.0.0.0 is capable of data communication (S215). As a result, the TV 100 determines that the DVD player 400 and the wireless communication device 300 are not capable of data communication.

If the DVD player 400 does not have a data communication function (No at S208), the DVD player 400 returns a response to the TV 100 indicating that it is not capable of data communication (S216). Accordingly, the TV 100, and the wireless communication devices 200 and 300 do not establish a data communication link between the TV 100, the wireless communication devices 200 and 300, and the DVD player 400 (S217). Then, the process ends.

Incidentally, if the wireless communication devices 200 and 300 do not return an HDMI physical address to the TV 100, it means that the DVD player 400 returns a response to the TV 100 indicating that it is not capable of data communication. Having not received the HDMI physical address of the DVD player 400, the TV 100 determines that the DVD player 400 is not capable of data communication. Naturally, a response maybe made by the DVD player 400 to indicate that it is not capable of data communication, and the response may be relayed to the TV 100. In the above description, even if the DVD player 400 is capable of data communication, when data communication is not possible between the wireless communication devices 200 and 300 (No at S211), the wireless communication devices 200 and 300 do not relay a response from the DVD player 400 to the TV 100; however, it is not so limited. For example, the wireless communication devices 200 and 300 may return a substitute for the response to the TV 100 indicating that data communication with the DVD player 400 is not possible.

In this manner, even if connected to a plurality of video/audio transmitters wirelessly, the TV 100 can communicate with each of them and appropriately determine whether it is capable of data communication. Thus, data communication can be automatically started with a video/audio transmitter capable of data communication in the WVAN. While an example is described above in which the TV 100 inquires of the DVD player 400 about the data communication capability, the DVD player 400 may inquire of the TV 100 about it in the same manner as described above except that signals flow in the opposite direction.

The wireless communication device exemplified above enables video/audio communication and data communication through a wireless communication system (wireless HD) using a millimeter wave band. Wireless communication using a millimeter wave band allows the wireless transmission of a video/audio signal, but has a physical property of high directivity. This is not likely to be a problem in one-to-one communication of video/audio signals between a video/audio receiver such as a TV and a video/audio transmitter such as a DVD player. However, in the case of data communication, especially, using a broadcast protocol such as Internet protocol, the wireless communication using a millimeter wave band with high directivity may cause a problem in broadcasting data to a plurality of wireless communication devices.

As described above, a problem may arise if video/audio communication and data communication are performed through only a wireless communication system using a millimeter wave band. To overcome the problem, communication may be performed wirelessly without an HDMI cable capable of transmission of a video/audio signal and data communication by using a combination of millimeter wave band wireless communication effective in the transmission of a video/audio signal and a wireless local area network (LAN) effective in data communication. However, such a configuration does not allow the user to easily and securely establish a wireless link between devices such as a TV and a DVD player because there is no input device such as a keyboard and a graphical user interface (GUI) unlike personal computers. In view of this, according to the embodiment, there is provided a wireless communication device that can solve the problem in the configuration of a combination of millimeter wave band wireless communication (wireless HD) and a wireless LAN effective in data communication. As a specific example, FIG. 3 illustrates a configuration of a system comprising wireless communication devices of the embodiment each connected to a device.

Figure 3:
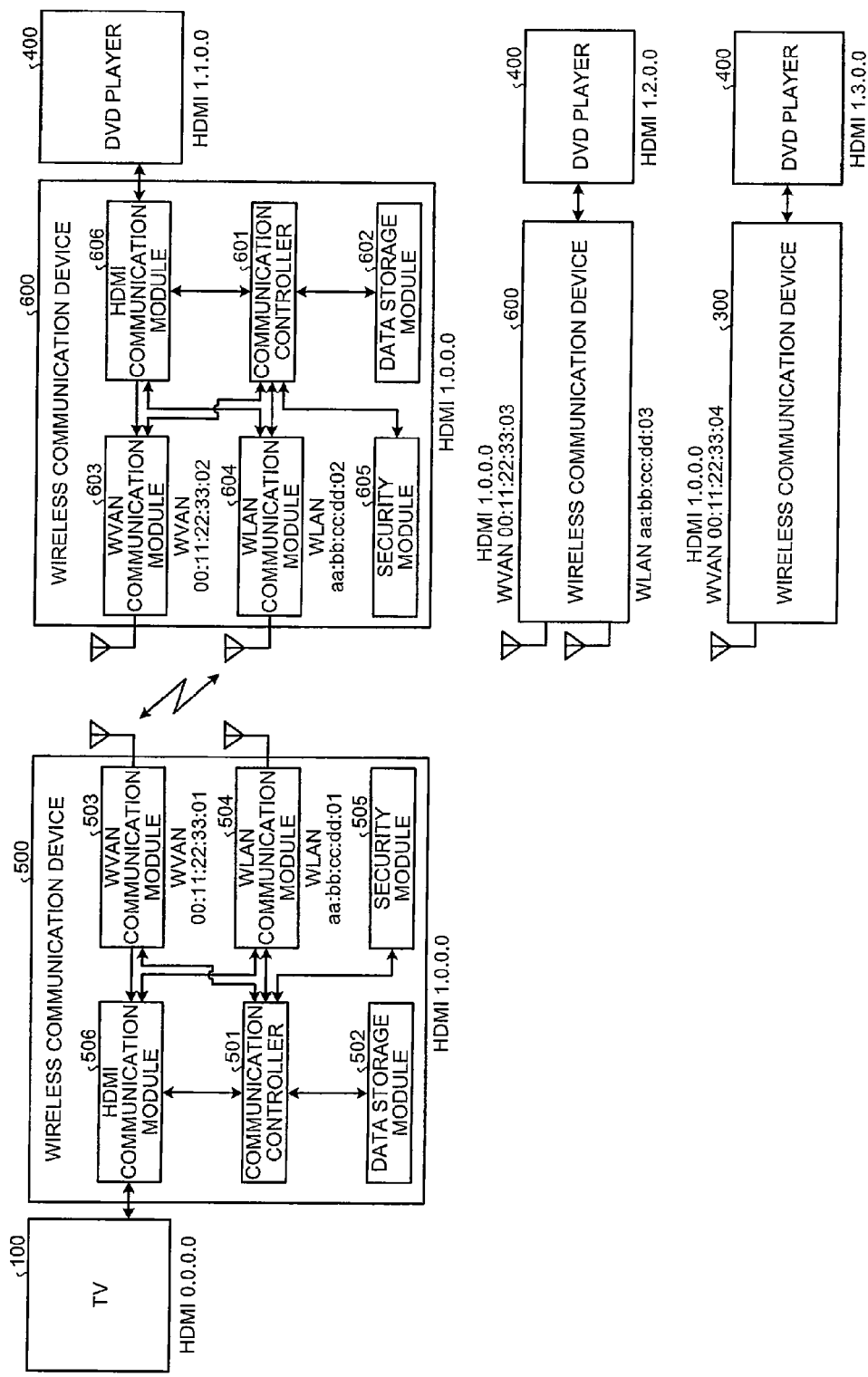
FIG. 3 is an exemplary block diagram of a system comprising the wireless communication device that is connected to another device in the first embodiment.

As illustrated in FIG. 3, the system comprises the TV 100, the wireless communication devices 500 and 600, and the DVD player 400. The wireless communication device 500 receives a video/audio signal and performs dada communication. The wireless communication device 500 comprises a communication controller 501, a data storage module 502, a WVAN communication module 503, a WLAN communication module 504, an HDMI communication module 506, and a security module 505. The communication controller 501 comprises a CPU and the like, and controls the overall Operation of the WVAN communication module 503, the WLAN communication module 504, and the HDMI communication module 506. The data storage module 502 stores information necessary for the communication controller 501 to control communication. Specifically, the data storage module 204 may be, for example, ROM, RAM, HDD, or the like. The data storage module 502 stores a control programs for the communication controller 501 and the security module 505, which will be described later. The data storage module 502 further stores the physical address of the WVAN communication module 503, the WLAN communication module 504, and the HDMI communication module 506, and the like.

The WVAN communication module 503 is a first wireless communication module that receives a video/audio signal and performs data communication. Specifically, the WVAN communication module 503 employs a wireless communication system capable of wireless HD video/audio communication or the like using a millimeter wave band of 60 GHz. The WLAN communication module 504 is a second wireless communication module that performs data communication. Specifically, the WLAN communication module 504 performs communication using a nondirectional (or less directional than wireless HD or the like) communication system, which is mainly used for data communication, through a wireless LAN (for example, wireless fidelity (Wi-Fi)), Bluetooth, or the like. It is assumed herein that, in at least peer-to-peer (P2P) communication, the WVAN communication module 503 communicates faster than the WLAN communication module 504 and is suitable for the transmission of an uncompressed signal. Each communication module is configured of dedicated hardware.

Incidentally, it is also assumed that communication referred to as data communication can be performed by the same communication system such as transmission control protocol/Internet protocol (TCP/IP) regardless of whether to use the WVAN communication module 503 (603) or the WLAN communication module 504 (604).

The security module 505 performs authentication for data communication and other security management processing. More specifically, the security module 505 manages a physical address allowed to access and, in the case of Wi-Fi, specifies the security settings of an extended service set identifier (ESSID) and a Wi-Fi protected access 2 (WPA2) using the WI-FI protected setup (WPS). The security module 505 (605) automatically generates a network name, a password, etc. necessary for data communication and exchanges them to automatically and securely establish a wireless data communication link. The security module 505 may be configured to be included in the communication controller 501.

In FIG. 3, "HDMI 1.0.0.0" or the like indicates that the HDMI physical address of the HDMI communication module is 1.0.0.0" or the like. Similarly, "WVAN 00:11:22:33:01" or the like indicates that the physical address on the WVAN is 00:11:22:33:01 or the like, and "WLAN aa:bb: cc: dd:01" or the like indicates that the physical address on the WLAN is aa:bb:cc:dd:01 or the like.

The wireless communication device 600 transmits a video/audio signal and performs dada communication (data transmission/receipt) as a source-side device. The wireless communication device 600 comprises a communication controller 601, a data storage module 602, a WVAN communication module 603, a WLAN communication module 604, an HDMI communication module 606, and a security module 605. The communication controller 601, the data storage module 602, the WVAN communication module 603, the WLAN communication module 604, the HDMI communication module 606, and the security module 605 have the same function as the communication controller 501, the data storage module 502, the WVAN communication module 503, the WLAN communication module 504, the HDMI communication module 506, and the security module 505 of the wireless communication device 500, respectively.

The wireless communication device 300 is of the same configuration as described previously in connection with FIG. 1. As illustrated in FIG. 3, the source-side wireless communication device comprises the WVAN communication module according to the wireless HD standard, and thereby constitutes the WVAN with the wireless communication device 500. Each wireless communication device is assigned a common HDMI physical address as an HDMI device. Accordingly, the source-side wireless communication device and the sink-side wireless communication device are regarded by other HDMI devices as one HDMI device. On the other hand, the wireless communication devices communicate with each other based on a physical address on the WVAN.

With reference to FIGS. 3 and 4, a description will then be given of the operation of each device in the system configured as above. FIG. 4 is a flowchart of the operation of the TV 100, the wireless communication devices 500 and 600, and the DVD player 400 to establish communication. FIG. 4 illustrates an example in which a data communication link is eventually established. If the WVAN communication module 503 or 603 is not capable of data communication, the WLAN communication module 504 or 604 is not present, or the TV 100 or the DVD player 400 is not capable of data communication, the process ends without the establishment of a data communication link.

In a manner previously described in connection with FIG. 2, a wireless link is established between the WVAN communication modules 503 and 603 (first wireless communication modules) (S401), and an HDMI physical address is assigned to each device (S402).

When the WVAN communication module 503 is capable of data communication (Yes at S403), the communication controllers 501 and 601 of the wireless communication devices 500 and 600 exchange the physical addresses of the WVAN communication modules 503 and 603 through the WVAN communication modules 503 and 603 as a response indicating that data communication is possible (S404). The communication controllers 501 and 601 store the physical addresses in the data storage modules 502 and 602, respectively.

When the WLAN communication module 504 (second wireless communication module) is present (Yes at S405), in the same manner as described above, the communication controllers 501 and 601 exchange the physical addresses of the WLAN communication modules 504 and 604 through the WVAN communication modules 503 and 603 as a response indicating that data communication is possible (S406). The communication controllers 501 and 601 store the physical addresses in the data storage modules 502 and 602, respectively. Here, the WVAN communication modules 503 and 603 and also the WLAN communication modules 504 and 604 each use a physical address compatible with a 48-bit extended unique identifier (EUI-48) that is defined by the IEEE 802 and used in the wireless LAN. Thus, it is ensured that both the addresses are unique.

After exchange of information as to whether the WVAN communication module 503 (first wireless communication module) and the WLAN communication module 504 (second wireless communication module) are capable of data communication, if the WVAN communication modules 503 and 603 are capable of data communication (Yes at S407), the communication controllers 501 and 601 regard that data communication is possible with respect to the physical addresses stored in the data storage modules 502 and 602, respectively, regardless of whether the addresses are of the WVAN communication module 503 or the WLAN communication module 504 (first or second wireless communication module) (S408). More specifically, if the WVAN communication modules 503 and 603 (first wireless communication modules) are capable of data communication, all access is allowed to the WVAN communication modules 503 and 603 from the physical addresses stored in the data storage modules 502 and 602. Thus, data communication is set as possible. Then, a wireless link is established for data communication (S409).

If the WLAN communication modules 504 and 604 (second wireless communication modules) are present (Yes at 5410), after the WLAN communication modules 504 and 604 are activated, all access is allowed to the WLAN communication modules 504 and 604 from the physical addresses stored in the data storage modules 502 and 602 (S411). When an access is made from any of the addresses, the security modules 505 and 605 specify the security settings of an ESSID and a WPA2 (S412). With this, a data communication link is established automatically and securely (S413).

Incidentally, if the WVAN communication modules 503 and 603 are capable of data communication, data communication becomes possible between the WVAN communication modules 503 and 603 as well as between the WLAN communication modules 504 and 604 at S413. However, it is preferable to give preference to data communication between the WLAN communication modules 504 and 604 over that between the WVAN communication modules 503 and 603 because of high directivity in data communication between the WVAN communication modules 503 and 603 using a millimeter wave band. Thus, a data communication link is established between the TV 100 and the DVD player 400 (S414).

As described above, according to the embodiment, when a video/audio communication link is established wirelessly between wireless communication devices, a wireless data communication link can be established automatically and securely only between desired devices based on the physical address (HDMI physical address) of wired connection. This enables data communication as well as video/audio communication. Moreover, even if there is a wireless communication device provided with only the WVAN communication module, a data communication link can be similarly established. In other words, even if the system comprises a device capable of both video/audio communication and data communication and a device capable of only video/audio communication, video/audio communication and data communication can both be established easily.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication device that is connected wirelessly as a sink-side device to a source-side communication device, the communication device comprising:

a wired communication module configured to transmit a video signal to a sink device and exchange a data signal with the sink device via wired communication;

a first wireless communication module configured to receive a video signal from the source-side communication device that is connected via a wire to a source device through a first wireless communication system capable of at least transmission and receipt of a video signal;

a second wireless communication module configured to exchange a data signal with the source-side communication device through a second wireless communication system; and a communication controller configured to control communication by the wired communication module, the first wireless communication module, and the second wireless communication module, the communication controller configured to perform processing related to a physical address used in a communication system of the wired communication module with the source-side communication device after the first wireless communication module establishes a wireless link, relay information as to data communication capability exchanged between the sink device and the source device through the wired communication module and the first wireless communication module;

exchange information as to data communication capability with the source-side communication device through the first wireless communication module, and when the sink device, the source device, and the source-side communication device are capable of data communication, set data communication as possible with a communication module assigned a physical address for wireless communication performed through the second wireless communication module.

2. The communication device of claim 1, wherein
the first wireless communication module is configured to have higher directivity than the second wireless communication module, and
the first wireless communication module is configured to be capable of receiving a video signal in parallel with data communication by the second wireless communication module.

3. The communication device of claim 1, wherein the communication controller is configured to prevent relay of the information as to data communication capability based on a response that the sink device or the source device is not capable of data communication.

4. The communication device of claim 1, wherein, upon exchanging the information as to data communication capability, when the communication device is not capable of data communication, the communication controller responds to indicate that data communication is not possible.

5. The communication device of claim 1, wherein, as a response to indicate that the sink device or the source device is capable of data communication, the communication controller is configured to transmit a physical address of the sink device or the source device.

6. The communication device of claim 5, wherein, upon exchanging the information as to data communication capability, when not receiving a physical address as a response, the communication controller determines that the source-side communication device is not capable of data communication.

7. A communication device that is connected wirelessly as a source-side device to a sink-side communication device, the communication device comprising:
a wired communication module configured to exchange a video signal and a data signal with a source device via wired communication;
a wireless communication module comprising a first wireless communication module configured to transmit a video signal to the sink-side communication device through a first wireless communication system capable of at least transmission and receipt of a video signal and a second wireless communication module configured to transmit and receive a data signal through a second wireless communication system; and
a communication controller configured to control communication by the wired communication module and the wireless communication module, the communication controller configured to
after the first wireless communication module establishes a wireless link between the communication devices, set a common physical address related to the wired communication module between the communication devices,
relay information as to data communication capability exchanged between a sink device and the source device through the wired communication module and the first wireless communication module;
exchange information as to whether data communication is possible between the wireless communication module and a wireless communication module of the sink-side communication device through the first wireless communication module, and
when the sink device, the source device, and the sink-side communication device are capable of data communication, set data communication as possible with a device or a communication module assigned the physical address.

8. The communication device of claim 7, wherein
the first wireless communication module is configured to have higher directivity than the second wireless communication module, and
the first wireless communication module is configured to be capable of receiving a video signal in parallel with data communication by the second wireless communication module.

9. The communication device of claim 7, wherein the communication controller is configured to not to relay the information as to data communication capability based on a response from the sink device or the source device that the sink device or the source device is not capable of data communication.

10. The communication device of claim 7, wherein, upon exchanging the information as to whether data communication is possible, when the communication device is not capable of data communication, the communication controller responds to indicate that data communication is not possible.

11. The communication device of claim 7, wherein, as a response to indicate that the sink device or the source device is capable of data communication, the communication controller is configured to transmit a physical address of the sink device or the source device.

12. The communication device of claim 11, wherein, upon exchanging the information as to whether data communication is possible, when not receiving a physical address as a response, the communication controller determines that the sink-side communication device is not capable of data communication.

* * * * *